United States Patent [19]
Wang et al.

[11] Patent Number: 5,715,428
[45] Date of Patent: Feb. 3, 1998

[54] APPARATUS FOR MAINTAINING MULTILEVEL CACHE HIERARCHY COHERENCY IN A MULTIPROCESSOR COMPUTER SYSTEM

[75] Inventors: Wen-Hann Wang, Portland; Konrad K. Lai, Aloha; Gurbir Singh, Portland; Michael W. Rhodehamel; Nitin V. Sarangdhar, both of Beaverton; John M. Bauer, Portland; Mandar S. Joshi; Ashwani K. Gupta, both of Beaverton, all of Oreg.

[73] Assignee: Intel Corporation, Santa Clara, Calif.

[21] Appl. No.: 639,719

[22] Filed: Apr. 29, 1996

Related U.S. Application Data

[63] Continuation of Ser. No. 202,428, Feb. 28, 1994, abandoned.
[51] Int. Cl.$^6$ ........................................ G06F 13/00
[52] U.S. Cl. .................... 395/468; 395/444; 395/446; 395/449; 395/457; 395/468; 395/473; 395/477; 364/DIG. 1
[58] Field of Search ........................ 395/444, 446, 395/449, 457, 468, 473, 477; 364/DIG. 1

[56] References Cited

U.S. PATENT DOCUMENTS

| | | | |
|---|---|---|---|
| 4,755,930 | 7/1988 | Wilson, Jr. et al. | 364/200 |
| 5,297,269 | 3/1994 | Donaldson et al. | 395/425 |
| 5,404,483 | 4/1995 | Stamm et al. | 395/425 |

OTHER PUBLICATIONS

"The Metaflow Architecture", pp. 10–13 and 63–73, by Val Popescu, Merle Schultz, john Spracklen, Gary Gibson, Bruce Lightner, and David Isaman, IEEE Micro, 1991.

*Primary Examiner*—Alyssa H. Bowler
*Assistant Examiner*—Dzung C. Nguyen
*Attorney, Agent, or Firm*—Blakely, Sokoloff, Taylor & Zafman

[57] ABSTRACT

A computer system comprising a plurality of caching agents with a cache hierarchy, the caching agents sharing memory across a system bus and issuing memory access requests in accordance with a protocol wherein a line of a cache has a present state comprising one of a plurality of line states. The plurality of line states includes a modified (M) state, wherein a line of a first caching agent in M state has data which is more recent than any other copy in the system; an exclusive (E) state, wherein a line in E state in a first caching agent is the only one of the agents in the system which has a copy of the data in a line of the cache, the first caching agent modifying the data in the cache line independent of other said agents coupled to the system bus; a shared (S) state, wherein a line in S state indicates that more than one of the agents has a copy of the data in the line; and an invalid (I) state indicating that the line does not exist in the cache. A read or a write to a line in I state results in a cache miss. The present invention associates states with lines and defines rules governing state transitions. State transitions depend on both processor generated activities and activities by other bus agents, including other processors. Data consistency is guaranteed in systems having multiple levels of cache and shared memory and/or multiple active agents, such that no agent ever reads stale data and actions are serialized as needed.

35 Claims, 2 Drawing Sheets

APPARATUS FOR MAINTAINING MULTILEVEL CACHE HIERARCHY COHERENCY IN A MULTIPROCESSOR COMPUTER SYSTEM

This is a continuation of application Ser. No. 08/202,428, filed Feb. 28, 1994, now abandoned.

FIELD OF THE INVENTION

The present invention relates generally to the field of high performance computer systems. More particularly, the invention relates to the field of cache memories and to apparatus and methods for maintaining coherency in a computer system having multiple caching agents.

BACKGROUND OF THE INVENTION

Since the beginning of electronic computing, main memory access has been much slower than processor cycle times. Access time is the time between when a read is initially requested and when the desired data word arrives. Processor cycle time refers to the minimum time between successive instruction executions. The gap between memory access time and processor cycle times continues to widen with advances in semiconductor technology. Efficient mechanisms to bridge this gap are central to achieving high performance in future computer systems.

The conventional approach to bridging the gap between memory access time and processor cycle time has been to introduce a high-speed memory buffer, commonly known as a cache, between the processor and main memory. The idea of a cache memory dates back several decades ago and was implemented in early computer systems such as the IBM system 360/85. Today, caches are ubiquitous in virtually every class of general purpose computer system. Very often, data stored within one cache memory is shared among the various processors or agents which form the computer system. The main purpose of a cache memory, of course, is to provide fast access time while reducing bus and memory traffic. A cache achieves this goal by taking advantage of the principles of spatial and temporal locality.

As semiconductor technology has continued to improve, the gap between memory access time and central processing unit (CPU) cycle time has widened to the extent that there has arisen a need for a memory hierarchy which includes two or more intermediate cache levels. For example, two-level cache memory hierarchies often provide an adequate bridge between access time and CPU cycle time such that memory latency is dramatically reduced. In these types of computer systems the first-level, primary cache (i.e., L1) provides fast, local access to data, while the second-level cache (i.e., L2) provides good data retention in bus and memory traffic.

Main memory is typically the last or final level down in the hierarchy. Main memory satisfies the demands of caches and vector units and often serves as the interface for one or more peripheral devices. Most often, main memory consists of core memory or a dedicated data storage device such as a hard disk drive unit.

One of the problems that arise in computer systems that include a plurality of caching agents and a shared data cache memory hierarchy is the problem of cache coherency. Cache coherency refers to the problem wherein—due to the use of multiple, or multi-level, cache memories—data may be stored in more than one location in memory. By way of example, if a microprocessor is the only device in a computer system which operates on data stored in memory, and the cache is situated between the CPU and memory, there is little risk in the CPU using stale data. However, if other agents in the system share storage locations in the memory hierarchy, this creates an opportunity for copies of data to be inconsistent, or for other agents to read stale copies.

Cache coherency is especially problematic in computer systems which employ multiple processors as well as other caching agents (e.g., input/output (I/O) devices). By way of example, a program running on multiple processors requires that copies of the same data be located in several cache memories. Thus, the overall performance of the computer system depends upon the ability to share data in a coherent manner. In the past, inclusion has often been imposed to simplify cache coherence control in multiprocessing environments so that the local cache memories are not disturbed by irrelevant coherence traffic. Inclusion, however, has drawbacks which make it desirable to implement cache coherence control in a way which obviates the need for inclusion.

As will be seen, the present invention provides a cache protocol for a computer system supporting high performance memory hierarchy with complete support for cache coherency. The cache protocol of the present invention supports multiple caching agents (e.g., microprocessors) executing concurrently, as well as writeback caching and multiple levels of cache memory.

SUMMARY OF THE INVENTION

To overcome the drawbacks of the prior art, one object of the present invention is to provide a cache coherency protocol for a high performance computer system.

Another object of the present invention is to provide a cache protocol that supports multiple caching agents such as multiple processors executing one or more programs concurrently.

Another object of the present invention is to provide a mechanism to ensure a highly efficient cache coherence control in a high performance computer system.

Still another object of the present invention is to define a set of rules governing state transitions for a cache protocol that associates states with lines, and wherein states in state transitions depend on both processor-generated activities, and activities by other bus agents.

Yet another object of the present invention is to provide mechanism for a high performance multiprocessor computing system that optimizes the first level cache tag array such that the inclusion property need not be imposed. This reduces the overhead of enforcing inclusion while maintaining high performance advantages of a multi-level cache hierarchy.

Another object of the present invention is to provide a protocol for a multiprocessor computer system that enhances the cache memory hierarchy such that the cache hierarchy does not block on a miss, to take advantage of the high performance nature of a system bus.

Still another object of the present invention is to provide a mechanism for cache coherence control in a high performance computer system that creates additional states to optimize performance for graphics and other special applications.

Yet another object of the present invention is to provide a cache coherence protocol for a high performance multiprocessing computer system that optimizes the linkage of all components and agents, while ensuring that the overall system operates not only correctly, but also efficiently.

These and other objects of the present invention are satisfied, in one embodiment, by a computer system comprising a plurality of caching agents with a cache hierarchy, the caching agents share memory across a system bus and issue memory access requests in accordance with a protocol wherein a line of a cache has a present state comprising one of a plurality of line states.

The plurality of line states includes a modified (M) state, wherein a line of a first caching agent in M state has data which is more recent than any other copy in the system; an exclusive (E) state, wherein a line in E state in a first caching agent is the only one of the agents in the system which has a copy of the data in a line of the cache, the first caching agent modifying the data in the cache line independent of other said agents coupled to the system bus; a shared (S) state, wherein a line in S state indicates that more than one of the agents has a copy of the data in the line; and an invalid (I) state indicating that the line does not exist in the cache. A read or a write to a line in I state results in a cache miss.

The present state transitions to a new state comprising a different one of the plurality of states, wherein a line in M state transitions to I state in response to a first set of external bus requests which includes a bus write line (BWL) transaction wherein a requesting agent intends to writeback a modified line.

The invention associates states with lines and defines rules governing state transitions. State transitions, according to the present invention, depend on both processor generated activities and activities by other bus agents (including other processors). Data consistency is guaranteed in systems having multiple levels of cache and shared memory and/or multiple active agents, such that no agent ever reads stale data and actions can be serialized as needed.

The cache protocol of the present invention also supports snooping operations. In snooping, every cache in the memory hierarchy that has a copy of data also includes a copy of the information about that data. These caches are usually coupled to a shared memory bus, such that all cache controllers monitor or snoop on the bus to determine whether or not they have a copy of the shared data.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

DETAILED DESCRIPTION

The present invention relates to a multiprocessor computer system and cache protocol that ensures data consistency while simplifying cache coherence control. In the following description, numerous specific details are set forth, such as particular structures, transactions, operations, etc., in order to provide a thorough understanding of the present invention. It should be understood, however, that these specific details need not be used to practice the present invention. In other instances, well known structures, circuits, and architectural functions have not been described in detail in order to avoid obscuring the present invention.

Figure 1:
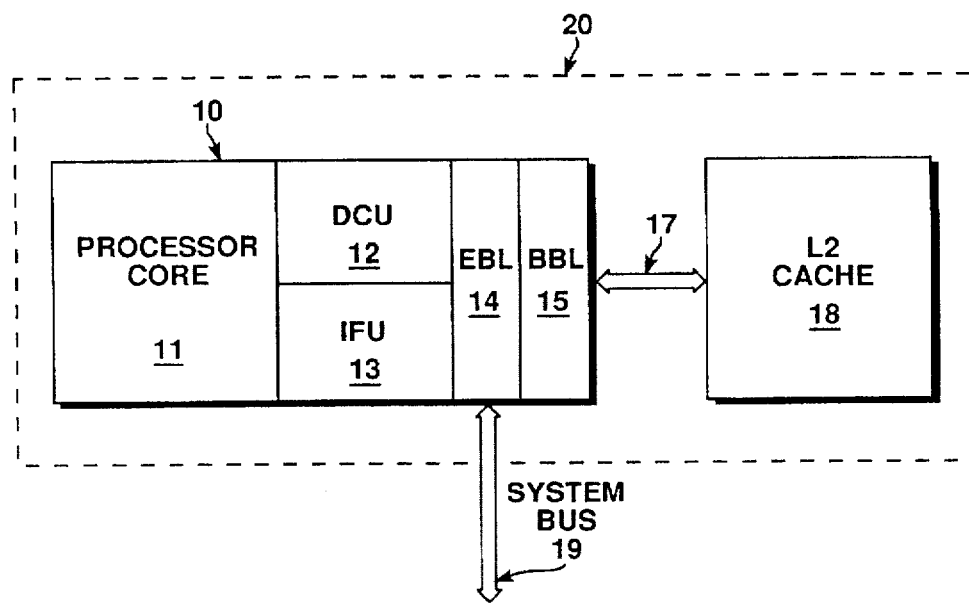
FIG. 1 is a block diagram of a high performance processor complex.

FIG. 1 is a block diagram of a high performance computer processor complex 20 which includes a processor 10 coupled to a secondary (L2) cache memory 18 across bus 17. L2 cache 18 represents the second level cache in the memory hierarchy. Although processor 10 may comprise a wide variety of different processing machines, in a current embodiment processor 10 comprises a processor core 11, a data cache unit (DCU) 12, an instruction fetch unit (IFU) 13, an external bus logic unit (EBL) 14, and a backside bus logic unit (BBL) 15.

As shown, BBL 15 controls the data flow between processor 10 and L2 cache 18 across backside bus 17. At the same time, EBL 14 governs data transactions that occur across system bus 19. Processor core 11, for example, includes the central processing unit (CPU) of the processor. DCU 12 comprises the first level data cache for the CPU of processor core 11, whereas IFU 13 comprises the first level instruction cache. Programs running in processor core 11 utilize instructions from cache 13 and data from cache 12 during normal operation. Of course, processor core 11 may read or write data from/to L2 cache 18, other caching agents coupled to bus 18, or main memory. External bus transactions are described for one embodiment of system bus 18 in copending application entitled, "Method and Apparatus for Performing Bus Transactions in a Computer System"; Ser. No. 08/085,541, filed Jun. 30, 1993, which application is assigned to the assignee of the present application. Specific types of bus transactions will shortly be discussed in conjunction with one implementation of the present invention.

Preferably, processor 10 comprises a high performance microprocessor compatible with the family of Intel architecture microprocessors manufactured by Intel Corporation of Santa Clara, Calif. Processor 10 and cache 18 are each fabricated as separate integrated circuits that are housed within a single package in one embodiment of complex 20. Both processor 10 and secondary cache memory 18 may be manufactured utilizing a high performance CMOS processing technology. It should be understood, however, that other processing technologies, and other architectures, may be utilized to implement complex 20 in the computer system of the present invention.

Figure 2:
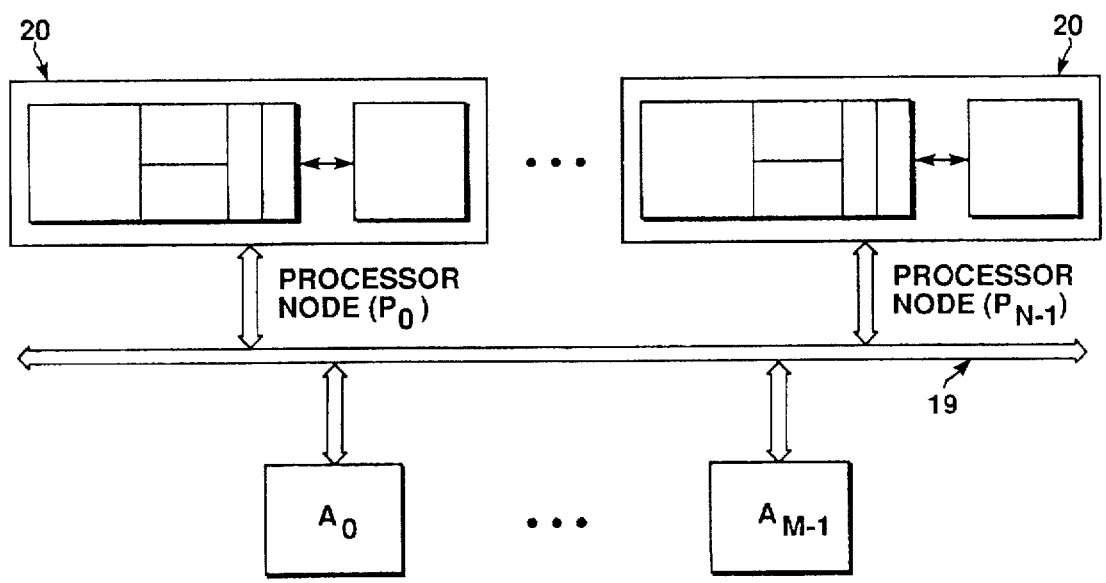
FIG. 2 illustrates the processor complex of FIG. 1 comprising one or more nodes in a computer system that includes a plurality of agents coupled to a common bus.

With reference to FIG. 2, there is shown a multiprocessor computer system which includes multiple processor nodes $P_0$–$P_{N-1}$. Each of the N processor nodes in the multiprocessor system comprises processor complex 20, as shown in FIG. 1. The N processors communicate and transfer information along a system bus 19. System bus 19 is also shown coupled to a plurality of J caching agents. The J agents are represented as blocks $A_0$ to $A_{J-1}$ in FIG. 2. By way of example, agents $A_0$ through $A_{J-1}$ may comprise any one of a variety of I/O devices, disk controllers, other processors, state machines, DMA devices, serial ports, etc., that communicate along bus 19.

It should be understood that the present invention is not limited to the particular configuration shown in FIG. 2. For example, alternative computer systems may comprise a single processor coupled to an I/O device, or a plurality of microprocessors coupled to a bus with no other agents. In basic terms, the invented cache protocol contemplates two or more caching agents sharing memory. Thus, the present invention can be implemented in a great variety of computing or data processing systems, of which the system of FIG. 2 is just one example.

It is also appreciated that in the computer system of FIG. 2, multiple copies of data may be found in several different caches. Furthermore, as will be explained in more detail shortly, a line can have different states in different agents. In such a computing environment, there is a need for a protocol that maintains coherency while optimizing performance and efficiency.

CACHE PROTOCOL

A description of the cache protocol, as well as the overall coherence operation that encompasses the bus control units, secondary cache memories, etc., of the present invention is described below.

In the field of computer memories, a "line" refers to the basic unit of caching. In one embodiment of processor 10, a line is 32 bytes of data or instructions, aligned on a 32-byte boundary in the physical address space; however, it is appreciated that the present invention also applies to line sizes other than 32-bytes. Each line has associated with it a state for each of the caches illustrated in FIG. 1. The processor cache protocol of the present invention belongs to a family of cache protocols called MESI protocols named after the four primary line states: M (Modified), E (Exclusive), S (Shared), and I (Invalid). A line can have different states in different agents, though the possible combinations are constrained by the protocol of the present invention. For example, a line can be Invalid in the L2 cache of processor $P_O$ and Shared in the cache of agent $A_{M-1}$.

Furthermore, a memory access (i.e., a read or a write) to a line in a cache can have different consequences depending on whether it is an internal or an external transaction. In general, an internal access is an access made by the CPU (or another bus agent containing a cache) to its local cache memory (e.g., L1 ). For instance, in the example of FIG. 1, an internal access by processor core 11 would request either data or instructions from DCU 12 or IFU 13, respectively. An external access, on the other hand, occurs when another processor or bus agent requests access to data stored in another cache memory or main memory. In the example of FIG. 2, this might occur where processor $P_{N-1}$ requests access to data stored in the L2 cache of processor node $P_O$.

The present invention includes many novel features having numerous advantages over prior approaches. For example, the invention provides a multi-level cache coherence protocol with enhanced L1 states for performance optimizations. The protocol is also non-inclusive—meaning that the L2 cache does not have to shield the L1 cache from external coherence traffic. Additionally, the invention supports out-of-order and speculative execution of instructions by way of special instruction cache support. The cache hierarchy is also non-blocking; that is, it does not block on cache misses. This feature permits full advantage of out-of-order processor execution and the bus. Finally, the invention allows transfer of ownership before data transfer actually takes place.

The following are L2 and a subset of L1 data cache states. The cache protocol states are defined as follows:

Modified (M): A line in M state has data which is more recent than any other copy in the system. It also means that the associated processor (i.e., processor 10) has exclusive ownership of the line. The line is invalid in all other caches of the system. Exclusive ownership of the data is essential to maintaining coherency. Internal reading or writing of the line generates no bus activity. In other words, a cacheable load or store to a M line can be completed without any bus activity.

Exclusive (E): A line in E state means that the processor is the only agent in the system which has a copy of this line in its cache. The Exclusive state implies that the processor can modify this line without informing any other processor or agent coupled to bus 19. Internal reading or writing of the line causes no bus activity; however, internally writing the line changes the line state to Modify. That is, a store or a load lock hit to an E line causes a transition from E state to M state. If another processor reads the line which is in E state, it causes a transition from E state to S state.

Shared (S): A line in Shared state means that one or more other agents (e.g., processors) coupled to the system bus have a copy of this line in their caches. A read to a shared line can be completed without any bus activity, but a store to a shared line causes the cache to invalidate the line and then perform a read to gain ownership of the line.

Invalid (I): An Invalid state assigned to a cache line means that the cache line does not exist in the data cache of the processor. A read or a write to this line will produce a miss, since the line is not available. An internal access to an Invalid line misses the cache and causes the processor to fetch the line into the cache from memory or from another cache. Thus, a cacheable read to an Invalid line results in a line fill. The new state of the line depends upon the state of the line in the caches of other processors coupled to the bus. If none of the other agents or processors on bus 19 have the line in their caches, then the new state will be Exclusive. If one or more processors have the line in their cache memories, then the new state of the line will be Shared. Note that if the L2 cache already has the data in M state, then the new state of the line will be Modified. If the memory type of the load which caused a miss was restrictive caching (RC), e.g., L1 cache only, then the new state will be RC Exclusive (RCE) in the L1 data cache. A cacheable store to an Invalid line causes the data cache to perform a read-for-ownership. The new state of the data will be RC Modified (RCM) in the L1 data cache if the memory type of the store was RC, otherwise it will be Modified.

The following are the remaining L1 states:

RC Exclusive (RCE) and RC Modified (RCM): These states are the same as Exclusive and Modified, respectively, as far as the local cache is concerned. These separate RC states are maintained to allow selective flush of lines which belong to the RC memory type.

Snooped (SL) and RC Snooped (RCSL): These two states indicate that a line which was previously in Modified or RC Modified state has hit with a snoop probe. In these states, loads, stores and replacements to this line are blocked until the snoop is confirmed, or aborted. If the snoop is confirmed, the state is changed to Shared or Invalid. If the snoop is aborted, however, then the state is changed back to Modified or RC Modified.

Note that data cache unit 12 supports cache coherency by acting upon snoop and invalidate requests from the snoop controller in EBL 14, and by sending directives for self-snooping along with requests made to EBL 14.

Figure 3:
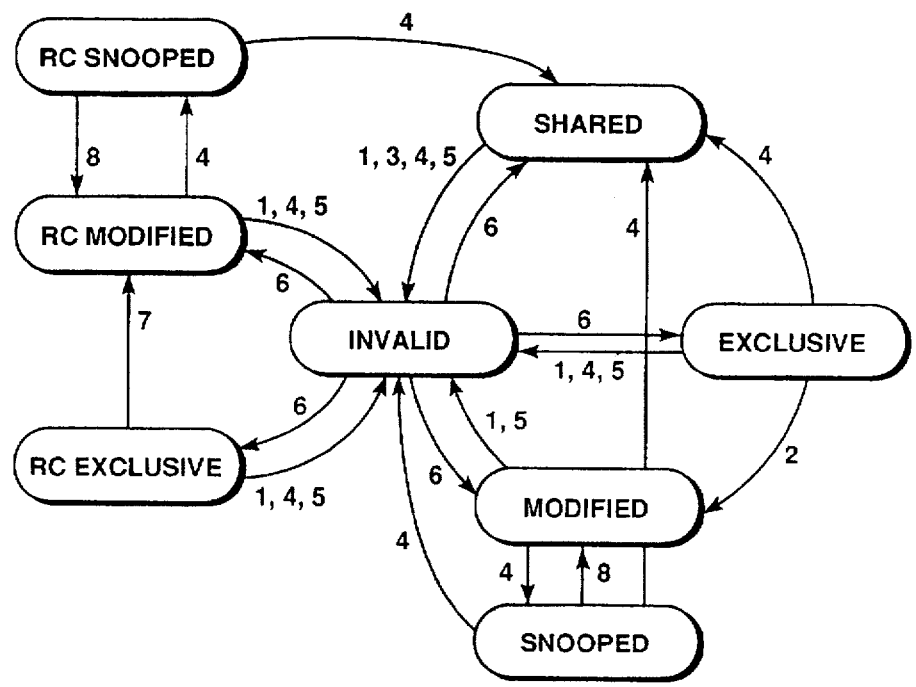
FIG. 3 is a data cache unit state transition diagram summarizing the coherency-related operations of a current embodiment of the present invention.

FIG. 3 is a state diagram summarizing the coherency related L1 data cache unit (DCU) operations for a current embodiment of the present invention. A description of the state transitions of FIG. 3 is provided in the key below.

Key For FIG. 3

1=Load Split Allocate
2=Store or Load Lock Hit to E
3=Store or Load Lock Hit to S
4=Snoop State Update
5=Line Flush/Invalidate
6=Replace
7=Store or Load Lock Hit to RCE
8=Snoop Abort Note that no inclusion property is enforced between the data cache in L1 and the L2. Instead, the data cache in L1 has a shared snoop port which allows the data cache tag array to be looked up at the same time that the L2 is being looked up for external snoop or invalidate requests.

The coherence operation of instruction fetch unit 13 is not as complex as that of data cache unit 12 since there is no data involved—only instructions. However it should be noted that in a currently preferred embodiment, processor 10 comprises an architecture making it capable of executing instructions out-of-order. Because of the speculative nature of processor 10—and due to the fact that inclusion is not imposed on the cache hierarchy in the present invention—special mechanisms are included to ensure correct and efficient operation of IFU 13. These mechanisms include a communication mechanism to notify the execution pipeline of processor core 11 that a snoop has occurred and that the instruction can potentially be stalled. In addition, a snoop queue is implemented to buffer incoming external snoops when the single snoop port is busy. (This feature is needed in the current embodiment with internal snoop requests in order to enforce correct operation of self-modifying codes.)

Snoop logic in EBL 14 receives snoop requests and their associated addresses from a data translation look-aside buffer associated with processor core 11 and EBL 14. The snoop requests and their addresses are then dispatched to the instruction cache in IFU 13. Preferably, IFU 13 also includes an instruction victim cache and a streaming buffer for buffering external memory accesses.

It is appreciated that a snoop request is a request to search the caches/buffers of IFU 13 for the snoop address. If a snoop hits in one or more of these caches/buffers, this fact is communicated to a memory ordering buffer of the processor as an internal snoop hit, or to a reorder buffer as an external snoop hit, consistent with the speculative nature of processor 10.

A snoop hit in IFU 13 eventually results in a sequence of steps known as an RONuke operation in the currently preferred embodiment of processor 10. An RONuke operation destroys the current load as well as the speculative progress of the computer; processor execution then restarts beginning with the aborted load. The RONuke operation occurs at the processor level (i.e., processor 10) in the current embodiment. An RONuke does not occur in the case of speculative internal snoop hit, because it implies the presence of stale instructions in the processor.

Note also that IFU 13 can process no more than one snoop request each clock in the current embodiment of processor 10. Therefore, a snoop queue is required to address the possibility of an internal snoop request colliding with an external snoop request. In the case of such collisions, the internal snoop immediately serviced while the external one queued.

CACHE COHERENCE OPERATION

Figure 4:
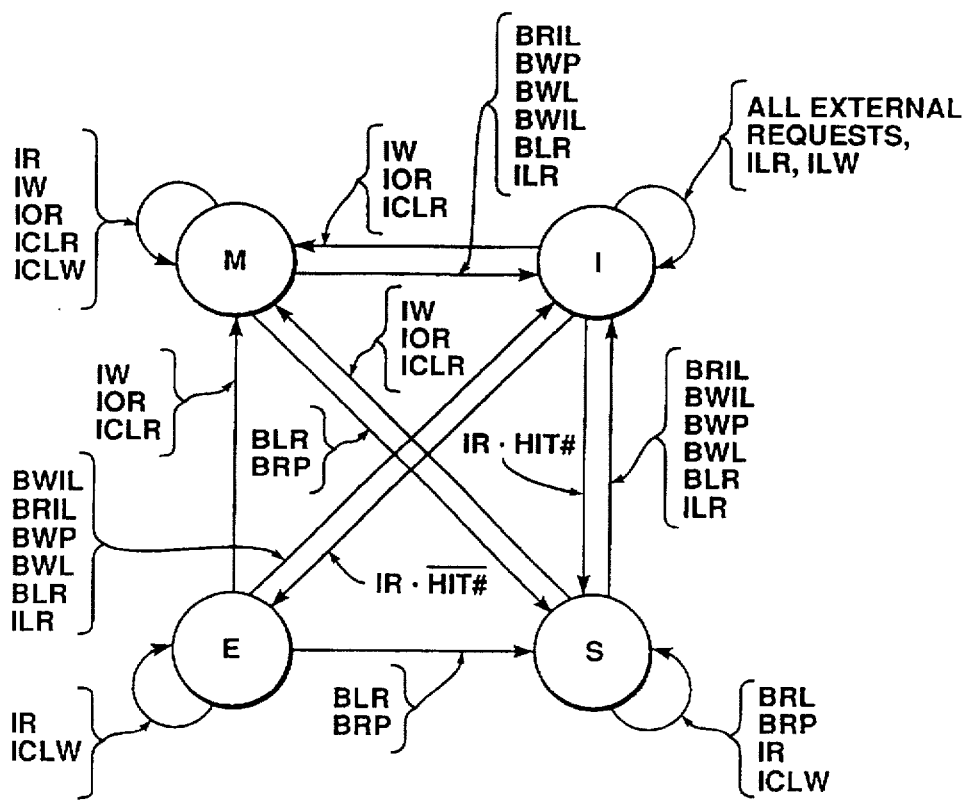
FIG. 4 is a cache state transition diagram illustrating a current embodiment of the cache protocol for the computer system of the present invention.

FIG. 4 shows the cache state transition diagram which defines the cache coherence operation for the computer system of the present invention. Note that for ease of explanation, the following description in reference to FIG. 4 uses a single level cache to represent the cache hierarchy of the present invention. But it should be keep in mind that the state transition diagram of FIG. 3 operates concurrently as the operations described in conjunction with FIG. 4. In other words, external bus transactions get translated to invalidate (5), snoop (4), or snoop abort (8) to the first level cache.

Internal or external bus transactions are capable of moving a cache line from one state to another state, as shown in FIG. 4. The list of internal and external transactions that relate to the cache coherence operation of the present invention will be described shortly.

A state transition is represented by an arc or an arrow in the diagram of FIG. 4. The types of transactions that can cause a state transition to occur are labeled next to the arc or arrow. For example, a Modified-to-Shared (M—>S) state transition can be caused by either a Bus Read Line (BRL) transaction or a Bus Read Part-Line (BRP) transaction. Another example is an Internal Read (IR) request that results in a miss, which can bring the line to an Exclusive state or to a Shared state, depending on the snoop result. In this particular example, the transaction type and snoop result are ANDed together to determine the final state of the line.

In accordance with the present invention, processor core 11 can issue the following memory access requests to the cache hierarchy:

Internal Read (IR): An internal read request to perform a read access.

Internal Write (IW): An internal write request to perform a write access.

Internal Cache Lock Read (ICLR): An internal cache locked read request to perform a cache lock read.

Internal Lock Read (ILR): An internal [split] locked read request to perform a [split] bus lock read.

Internal Ownership Read (IOR): An internal ownership read request to perform a write prefetch.

Internal Cache Lock Write (ICLW): An internal cache lock write request to perform a cache lock write.

Internal Lock Write (ILW): An internal [split] locked write request to perform a [split] bus lock write.

In the preceding list all transactions are internal to the processor or caching agent (e.g., from DCU 12 and IFU 13). (Note IFU 13 only issues internal read requests.) The following list includes transactions that are external transactions, i.e., transactions that take place across system bus 19.

Bus Read Line (BRL): A bus read line transaction is either a read code line or read data line transaction. The requesting agent has had a read miss in this case.

Bus Read Invalidate Line (BRIL): A bus read invalidate line transaction indicates that a requesting agent issued a read invalidate line transaction. The requesting agent has had a read miss and intends to modify this line when the line is returned.

Bus Write Line (BWL): A bus write line transaction indicates that a requesting agent issued a write line transaction. The requesting agent therefore intends to writeback a modified line, or an I/O agent intends to write a line to memory.

Bus Write Invalidate Line (BWIL): A bus write invalidate line transaction indicates that a requesting agent issued a write invalidate line transaction. The requesting agent contains the line in Shared state and intends to modify that line. In the case of a race condition, the response for this transaction may contain data.

Bus Read Part-Line (BRP): A bus read part-line transaction indicates that a requesting agent has issued a Read Data Partial, Read Data 8 bytes, Read Data 16 bytes, or Read Code 16 bytes transaction.

Bus Write Part-Line (BWP): A bus write part-line transaction indicates that a requesting agent has issued a Write Partial, Write 8 bytes, or Write 16 bytes transaction.

Bus Locked Read (BLR): A bus locked read transaction indicates that a requesting agent issued a locked read partial or locked read 8 bytes transaction.

Bus Locked Write (BLW): A bus locked write transaction indicates that a requesting agent has issued a locked write partial or locked write 8 bytes transaction.

Implicit Writeback: An implicit writeback is not an independent bus transaction; it is a response to another transaction which requests the most recent data. When an external request hits a modified line in the local cache or buffer, an implicit writeback is performed to provide the modified line and at the same time update memory.

Note that in accordance with the current embodiment of the present invention, each line has an associated memory type, which, for caching purposes, can be writeback (WB), write-through (WT), write-protected (WP), or uncacheable (UC). A WB line is cacheable and is always fetched into the cache if a miss occurs. A write to a WB line does not cause bus activity if the line is in the Exclusive or Modified states. A WT line is cacheable but is not fetched into the cache on write miss. A write to a WT line goes out onto system bus 19. In a preferred embodiment of processor 10, a WT hit to the local cache updates the local cache. A WT hit to L2 cache 18 invalidates the L2 cache. A WP line is also cacheable, but a write to it cannot modify the cache line, and the write always goes out onto the bus. The WP line is not fetched into the cache on a write miss. A WP hit to the L2 cache 18 invalidates the line in the L2 cache. A UC line hit to the local or L2 cache invalidates the entry.

With continuing reference to the cache state transition diagram of FIG. 4, note that a cache line in Exclusive state can transition to the Exclusive, Shared, Modified or Invalid states depending upon the request type. For example, if the request type is BWIL, BRIL, BWP, BWL, BLR, or ILR, the final state of the line is Invalid. If the request type is BRL or BRP, the final line state is Shared. Likewise, if the request type is IW, IOR, or ICLR, the final state of the line is Modified. Finally, if the line is in Exclusive state and the request type is IR, or ICLW, the line remains in Exclusive state.

To better appreciate the advantages of the present invention consider the following example. Suppose a situation arises in a computer system that includes three processors ($P_1$, $P_2$, and $P_3$) wherein processor $P_1$ contains a cache line in Modified state and processor $P_2$ subsequently requests to read the line for ownership. Assume that processor $P_1$ provides the line to $P_2$ on a postponed basis. Next, further assume that processor $P_3$ also requests to read the cache line in processor $P_1$. In accordance with the protocol of the present invention because processor $P_1$ has passed ownership to $P_2$, processor $P_2$ now becomes the agent responsible for giving the data to processor $P_3$. This is true despite the fact that $P_2$ may not have the line yet since the read was postponed. Eventually, processor $P_3$ will obtain the data from $P_2$.

Thus, the present invention provides a dynamic cache protocol that is highly flexible and efficient, while providing coherent cache operation.

What is claimed is:

1. A computer system comprising a plurality of caching agents with a cache hierarchy, said caching agents sharing memory across a system pipeline bus capable of simultaneously transmitting multiple memory access request, and said caching agents issuing memory access requests in accordance with a protocol wherein a line of a cache has a present state comprising one of a plurality of line states, said line states stored in said caching agents, said plurality of line states including: a modified (M) state, wherein a line of a first caching agent in said M state has data which is more recent than any other copy in said system; an exclusive (E) state, wherein a line in said E state in said first caching agent is the only one of said agents in said system which has a copy of the data in said line of said cache, said first caching agent modifying the data in said cache line independent of other said agents coupled to said system pipeline bus; a shared (S) state, wherein a line in said S state indicates that more than one of said agents has a copy of the data in the line; and an invalid (I) state indicating that said line does not exist in said cache, a read or a write to a line in said I state resulting in a cache miss; said present state transitioning to a new state comprising a different one of said plurality of states wherein a line in said M state transitions to said I state in response to a first set of external bus requests which includes a bus write line (BWL) transaction wherein a requesting agent intends to writeback a modified line.

2. The computer system of claim 1 wherein said first caching agent comprises a processor having a data cache unit.

3. The computer system of claim 1 wherein each of said caching agents comprise a microprocessor, each having a data cache unit.

4. The computer system of claim 2 wherein each of said caching agents includes a separate secondary cache memory coupled to said processor, therein forming a processor complex.

5. The computer system of claims 1, 2, 3, or 4 wherein said first set of external bus transactions further includes a bus write invalidate line (BWIL) transaction wherein a requesting agent contains a line in said S state and intends to modify the line.

6. The computer system of claim 5 wherein said first set of external bus transactions further includes:

a bus locked read (BLR) transaction wherein said requesting agent issues a Locked Partial Read or Locked Read 8 Bytes transaction;

a bus read invalidate line (BRIL) transaction wherein said requesting agent has had a read miss to a line and intends to modify the line;

a bus write part-line (BWP) transaction wherein said requesting agent issued a Read Data Partial, Read Data 8 Bytes, or Read Data 16 Bytes transaction; and a bus locked write (BLW) transaction wherein a requesting agent issues a Locked Write Partial or a Locked Write 8 Bytes transaction.

7. The computer system of claim 6 wherein a line in said S state transitions to said I state in response to any of said first set of external bus transactions.

8. The computer system of claim 7 wherein a line in said E state transitions to said S state in response to a second set of external bus transactions.

9. The computer system of claim 8 wherein said second set of external bus transactions includes a bus read line (BRL) transaction wherein a requesting agent has had a read miss.

10. The computer system of claim 9 wherein said second set of external bus transactions further includes a bus read part-line (BRP) transaction wherein a requesting agent issues a Read Data Partial, Read Data 8 Bytes, or Read Data 16 Bytes transaction.

11. The computer system of claim 6 wherein a line in said E state transitions to said I state in response to said first set of external bus transactions.

12. The computer system of claim 6 wherein a line in said M state transitions to said S state in response to said second set of external bus transactions.

13. The computer system of claim 12 wherein a line in said S state transitions to said M state in response to said first set of internal read transactions, said first set of internal read transactions including an internal write (IW) request to perform a write access.

14. The computer system of claim 13 wherein said first set of internal read transactions further includes an internal ownership read (IOR) request to perform a write prefetch, and an internal cache locked read (ICLR) request to perform a cache lock read.

15. The computer system of claim 14 wherein a line in said E state transitions to said M state in response to said first set of internal read transactions.

16. The computer system of claim 14 wherein a line in said I state transitions to said M state in response to said first set of internal read transactions.

17. The computer system of claims 1, 2, 3 or 4 wherein said caching agents each snoop said system pipeline bus and provide a signal to indicate a snoop result.

18. The computer system of claim 17 wherein a line in said I state transitions to said S state in response to an internal read request to perform a read access when said signal is in a first logical state.

19. The computer system of claim 18 wherein a line in said I state transitions to said E state in response to an internal read request to perform a read access when said signal is in a second logical state, said second logical state being the complement of said first logical state.

20. A computer system comprising:
a plurality of caching agents, each caching agent including a processor, a first level cache coupled by a backside bus to a separate second level cache, said second level cache storing data independent from any data stored in said first level cache, said caching agents Sharing memory across a system bus, each said caching agent further providing a direct access between the first level cache and the system bus, and providing a direct access between the second level cache and the system bus, said caching agents issuing memory access requests access a system bus in accordance with a protocol wherein each line of a cache has a present state comprising one of a plurality of line states stored in a respective cache, said plurality of line states including: a modified (M) state, wherein a line of a first caching agent in said M state has data which is more recent than any other copy in said system; an exclusive (E) state, wherein a line in said E state in said first caching agent is the only one of said agents in said system which has a copy of the data; a shared (S) state, wherein a line in said S state indicates that more than one of said agents has a copy of the data in the line; and an invalid (I) state indicating that said line does not exist in said cache; wherein, said present state of a line of said first caching agent transitions to a new state in response to said first caching agent receiving a bus transaction.

21. The computer system of claim 20, wherein the first level cache of each caching agent includes a data cache unit, and said plurality of line states for a data cache unit further includes: a restrictive caching exclusive (RCE) state, wherein a line in said RCE state includes data loaded in response to a missed memory access request to a respective data cache unit and is the only copy of said data in said system; and, a restrictive caching modified (RCM) state, wherein a line in said RCM state includes data loaded in response to a missed memory access request to the respective data cache unit and is a most recent copy of said data in said system.

22. The computer system of claim 20, wherein each processor included in each caching agent is capable of executing instructions out-of-order and performing speculative execution of instructions.

23. The computer system of claim 22, wherein each first level cache of each said caching agent includes an instruction fetch unit, wherein in response to an external snoop hit in one of said instruction fetch units, a current speculative execution cycle of a requesting agent is aborted.

24. The computer system of claim 23, wherein each instruction fetch unit includes a snoop queue capable of buffering incoming external snoops, wherein in response to an internal snoop colliding with an external snoop in one of said instruction fetch units, the internal snoop is serviced and the external snoop is buffered in said snoop queue.

25. The computer system of claim 20, wherein said protocol allows for transferring ownership of a line in a caching agent prior to transferring data stored in said line.

26. The computer system of claim 25, wherein said protocol includes transitioning a line in said M state, said S state, or said E state to said I state in response to a first set of external bus requests which includes a bus write line (BWL) transaction wherein a requesting agent intends to writeback a modified line.

27. The computer system of claims 26, wherein said first set of external bus transactions further includes a bus write invalidate line (BWIL) transaction wherein a requesting agent contains a line in said S state and intends to modify the line.

28. The computer system of claim 27 wherein said first set of external bus transactions further includes:
a bus locked read (BLR) transaction wherein said requesting agent issues a Locked Partial Read or Locked Read 8 Bytes transaction;
a bus read invalidate line (BRIL) transaction wherein said requesting agent has had a read miss to a line and intends to modify the line;
a bus write part-line (BWP) transaction wherein said requesting agent issued a Read Data Partial, Read Data 8 Bytes, or Read Data 16 Bytes transaction; and
a bus locked write (BLW) transaction wherein a requesting agent issues a Locked Write Partial or a Locked Write 8 Bytes transaction.

29. The computer system of claim 28, wherein said protocol further includes transitioning a line in said E state or a line in said M state to said S state in response to a second set of external bus transactions, said second set of external bus transactions including a bus read line (BRL) transaction wherein a requesting agent has had a read miss.

30. The computer system of claim 29 wherein said second set of external bus transactions further includes a bus read part-line (BRP) transaction wherein a requesting agent issues a Read Data Partial, Read Data 8 Bytes, or Read Data 16 Bytes transaction.

31. The computer system of claim 30 wherein said protocol further includes transitioning a line in said S state, said E state, or I state, to said M state in response to said first set of internal bus transactions, said first set of internal bus transactions including an internal write (IW) request to perform a write access.

32. The computer system of claim 31 wherein said first set of internal bus transactions further includes an internal ownership read (IOR) request to perform a write prefetch, and an internal cache locked read (ICLR) request to perform a cache lock read.

33. The computer system of claim 32 wherein said protocol further includes transitioning a line in said I state to said S state in response to an internal bus request to perform a read access, wherein more than one of said caching agents has a copy of a data to be read.

34. The computer system of claim 33 wherein said protocol further includes transitioning a line in said I state to said E state in response to an internal bus request to perform a read access, wherein only one of said caching agents has a copy of a data to be read.

35. The computer system of claim 20, wherein said system bus is capable of simultaneously transmitting multiple memory access request.

* * * * *